United States Patent
Zeelen

(10) Patent No.: US 8,666,552 B2
(45) Date of Patent: Mar. 4, 2014

(54) METHOD AND DEVICE FOR THE REMOVAL OF A LEAF FROM A CROP

(76) Inventor: Ronald Zeelen, Delft (NL)

( * ) Notice: Subject to any disclaimer, the term of this patent is extended or adjusted under 35 U.S.C. 154(b) by 618 days.

(21) Appl. No.: 12/937,819

(22) PCT Filed: Apr. 14, 2009

(86) PCT No.: PCT/NL2009/050191
§ 371 (c)(1),
(2), (4) Date: Oct. 21, 2010

(87) PCT Pub. No.: WO2009/128712
PCT Pub. Date: Oct. 22, 2009

(65) Prior Publication Data
US 2011/0046785 A1 Feb. 24, 2011

(30) Foreign Application Priority Data
Apr. 14, 2008 (NL) .................................... 2001479

(51) Int. Cl.
*A01D 46/30* (2006.01)
*A01G 3/08* (2006.01)

(52) U.S. Cl.
USPC ............................................ 700/259; 901/47

(58) Field of Classification Search
USPC ........... 700/249, 258, 259; 701/50; 901/9, 31, 901/47; 460/1, 123–125, 134, 136; 56/10.2 A
See application file for complete search history.

(56) References Cited

U.S. PATENT DOCUMENTS

| | | | | |
|---|---|---|---|---|
| 4,425,751 A | * | 1/1984 | Bousseau et al. | ............ 56/327.2 |
| 4,532,757 A | * | 8/1985 | Tutle | ............................ 56/328.1 |
| 4,663,925 A | * | 5/1987 | Terada | ........................... 56/328.1 |
| 4,975,016 A | * | 12/1990 | Pellenc et al. | ................. 414/501 |
| 5,544,474 A | * | 8/1996 | Finkelstein | .................. 56/10.2 A |
| 7,765,780 B2 | * | 8/2010 | Koselka et al. | ............. 56/10.2 A |
| 7,854,108 B2 | * | 12/2010 | Koselka et al. | ............. 56/10.2 A |
| 2006/0213167 A1 | * | 9/2006 | Koselka et al. | ............. 56/10.2 A |
| 2008/0010961 A1 | * | 1/2008 | Gray | ........................... 56/10.2 A |
| 2011/0022231 A1 | * | 1/2011 | Walker et al. | .................. 700/259 |
| 2011/0137456 A1 | * | 6/2011 | Koselka et al. | ............... 700/245 |

FOREIGN PATENT DOCUMENTS

| | | |
|---|---|---|
| EP | 0597253 | 5/1994 |
| EP | 1891852 | 2/2008 |
| NL | 1024702 | 5/2005 |
| NL | 2000333 | 11/2007 |

OTHER PUBLICATIONS

International Search Report dated Jul. 16, 2009, in PCT application.

* cited by examiner

*Primary Examiner* — Jason Holloway

(74) *Attorney, Agent, or Firm* — Young & Thompson

(57) ABSTRACT

Method and device for the removal of a part of a crop, such as a leaf (14). To this end, the crop is approached from a low position with vision techniques and the stem (12) and the parts protruding therefrom are observed from beneath. Based upon the number of images observed, an arm is controlled and moved towards the relevant stalk (13). This movement is primarily parallel to the stalk and is performed from a low proximity position. When the stalk (13) is approached, the stalk (13) is positioned within an opening between two rotating parts (3). The stalk is grasped by way of rotation and the stalk is moved in respect of the arm so that the cutting point of the stalk is manipulated towards the arm. The stalk (13) is subsequently cut through and the leaf is disposed of.

15 Claims, 4 Drawing Sheets

METHOD AND DEVICE FOR THE REMOVAL OF A LEAF FROM A CROP

The present invention relates to a method for the removal of a part, such as a leaf of a crop, with a central stalk, comprising approaching said part with a robot arm using vision techniques, grasping said part of the crop by said arm and the removal thereof by said arm.

Such a method is known from NL 102 47 02. Therein, an arm located on a trolley is moved towards the main stem of a crop. The arm, and in particular the cutting blades mounted thereon, grasp around the main stem and the arm with blades is subsequently moved upwardly along the main stem, removing all stalks protruding from the main stem. Although this method is effective with regard to the removal of the leaves, it has become apparent that the stalks are not cut through in the best possible place.

NL 2000333 describes a method for the removal of leaves, wherein the stalk is used as a guide for the device used in the method.

From the prior art, other methods for the removal of parts of crops are known, such as approaching the crop laterally and moving the cutting arms into the crop based upon the forces sensed as that operation is performed.

Such techniques have the disadvantage that a great deal of software is required in order for the correct decisions to be made with regard to the cutting process and, due its complexity, the number of parts of the crop removed per unit of time is insufficient to make this technique competitive in comparison to the manual removal of leaves.

An example of the removal of parts of crops can be found in tomatoes and/or cucumbers. With tomatoes, the object is to remove the leaves from between the fruits. This prevents diseases from occurring and promotes the growth of other parts of the crop. In other crops, similar or other reasons apply for the removal of the leaves.

An object of the present invention is to provide a method with which it is possible to remove parts of crops, such as leaves or (small) shoots from crops, in a relatively quick and efficient way.

Furthermore, it is an object of the present invention to enable the removal of leaves with considerable speed with relatively simple and robust means, both in relation to the electronics applied, as well as the mechanics. This relates to the aforementioned leaves found beneath a fruit, as well as those found in other parts of the crop, whilst the fruits remain unaffected.

This object is achieved with a method for the removal of a leaf from a crop comprising the observation of the crop from a low position, using vision techniques to determine the leaf to be removed, the removal of said leaf by stripping means, wherein said removal comprises engaging said leaf or its stalk, separating said stalk from the central stem of the crop and carrying the leaf away from said crop, after the removal of said leaf, the repeated observation of said crop and the use of the vision techniques to determine the next leaf to be removed and then the removal of said leaf.

According to the present invention, the crop is observed from below, or from another starting point, with a camera, for example. This means that, as opposed to previously known methods, a camera is no longer moved into the dense crop, but the crop is only (obliquely) observed from beneath the crop. Subsequently, it is determined which leaf is to be removed, preferably the lowest one, and this can be stripped from the main stem of the crop in some manner known in the prior art. In so doing, it is important that the individual leaf thus removed is not simply released after stripping it from the main stem, but that it is removed from the vicinity of the crop in some conceivable manner. This removal of leaves from the vicinity of the crop may comprise the collection of the leaves in the direct vicinity thereof, but also transporting them to a container provided for that purpose. Subsequently, a new situation occurs, in that the leaf concerned has been removed from the crop. On that basis, the crop is observed again from below and the related camera then has an unobstructed view of the next leaf that is considered for removal. Accordingly, the next leaf can be removed by a relatively simple separation means. In this manner, the leaves are stripped from the crop step-by-step, from a low proximity position, wherein the vision techniques relating to the camera with which the stripping means are controlled, are always in an optimum situation for recognition of the leaf. This situation can be further optimized by the introduction of depth, for example, and other features that distinguish the position of the lowest leaf in respect of the remaining leaves. It is also possible to begin at a higher position with the removal of leaves and to work upwards from such position. In that case, only a limited number of leaves or the like can be removed.

With the present invention, it is not only possible to remove the leaves from a crop from beneath in the manner described above, but it is likewise possible, if crops are located close proximity to one another, to remove the leaves from other crops when moving upwards. That means that, in contrast to systems that are oriented entirely on the stem of a crop, with the present invention it is possible to use the vision techniques for observation and leaf-by-leaf removal from adjacent crops as viewed from beneath the crop. Since the view of the leaf concerned is essentially unobstructed, because it is often the lowest leaf in the surroundings, the removal can be performed in an optimum and uninterrupted manner, thus enabling the related automation to be relatively simple.

Furthermore, the vision techniques applied can be developed in such a manner that a distinction is made between a leaf and another part of the crop, such as a fruit. In such a case, a fruit can not be stripped off whilst a leaf located in close proximity to and around the fruit can indeed be stripped off.

Since it is very well possible that leaves are found on different sides of a central stem, observation with a camera can be significantly improved if, for example, the crop is observed from different positions upwardly (obliquely) from a horizontal plane. This is further improved if the robot forming part of the stripping means moves within the line of sight of the camera. Since the leaves are stripped from the crop from beneath and upwards, the separating means can be made less compact and therefore more robust or faster, because it is not necessary for the stripping means to extend through the dense crop.

Preferably, stripping the leaf, and in particular its stalk, is performed at a position close to the attachment of the stalk to the central stem. This can be achieved, for example, by allowing the separation means to first grasp the leaf and subsequently, to move the separation means as far as possible along said leaf towards the central stem, possibly along the stalk towards the point of attachment of the stalk to the central stem. The stripping action can subsequently be activated by the contact of the separation means with the central stem. Additionally, according to one advantageous embodiment of the invention, other parts of the crop, such as fruits, are pushed aside without causing damage to them.

According to the present invention, there is essentially no contact with the central stem except for when moving from the leaf towards the central stem in order to find the optimum stripping position of the stem of the leaf and crop stem. The stripping method described above can be performed in any conceivable manner, such as by cutting or clipping the method can be performed continuously and without further supervision. Moreover, threads used for tying the crop up will not be touched because leaf stripping is performed from the position of the leaf and not from the position of the central stem. The method can be performed in a simple manner, controlled from the pathway. By working from both sides, it can be ensured that the crop is approached from all sides and that the leaves can be removed from any given location. Vision techniques can be provided with simple software for cutting leaf stalks and stems. Information can be added to such software, such as the recognition of certain fruits, the points of attachment of leaf stalks, stems and the like. According to a further embodiment of the invention, the stripping means can be equipped with a camera or the like, in order to check whether a leaf and its stalk is actually approached and stripped from the central stem. Further simplification can be achieved if the stripping means move within the line of sight of the observation. This is particularly advantageous if obstacles are anticipated. Any such problems can be prevented in this manner.

It will be evident from the above that the approach presently opted for can be achieved very simply and robustly and that the stripping operation can be performed in a particularly simple manner.

Additionally, the present invention relates to a device for the removal of a leaf from a crop, comprising a camera for observation of a crop from a low proximity position, a central processing unit to which the camera is connected, comprising vision techniques for determining a leaf to be removed, a mobile trolley on which the stripping means are mounted, controllable from the central processing unit, for grasping, stripping and removing said leaf. Additionally, it is also possible to arrange the camera and/or central processing unit on the trolley. However, it is also possible to arrange the camera in a stationary position, for example, for continuously monitoring the development of the crop and the application specified above. Additionally, it is possible to manage two positions with several stripping means and, for example, with two cameras.

The invention will be set forth in detail according to the typical embodiment shown in the drawing, in which:

FIG. 1a-c shows a schematic, perspective view of an example of the stripping of a leaf according to the present invention;

The method according to the invention will be described schematically in more detail with reference to FIG. 1a-c.

Figure 1:
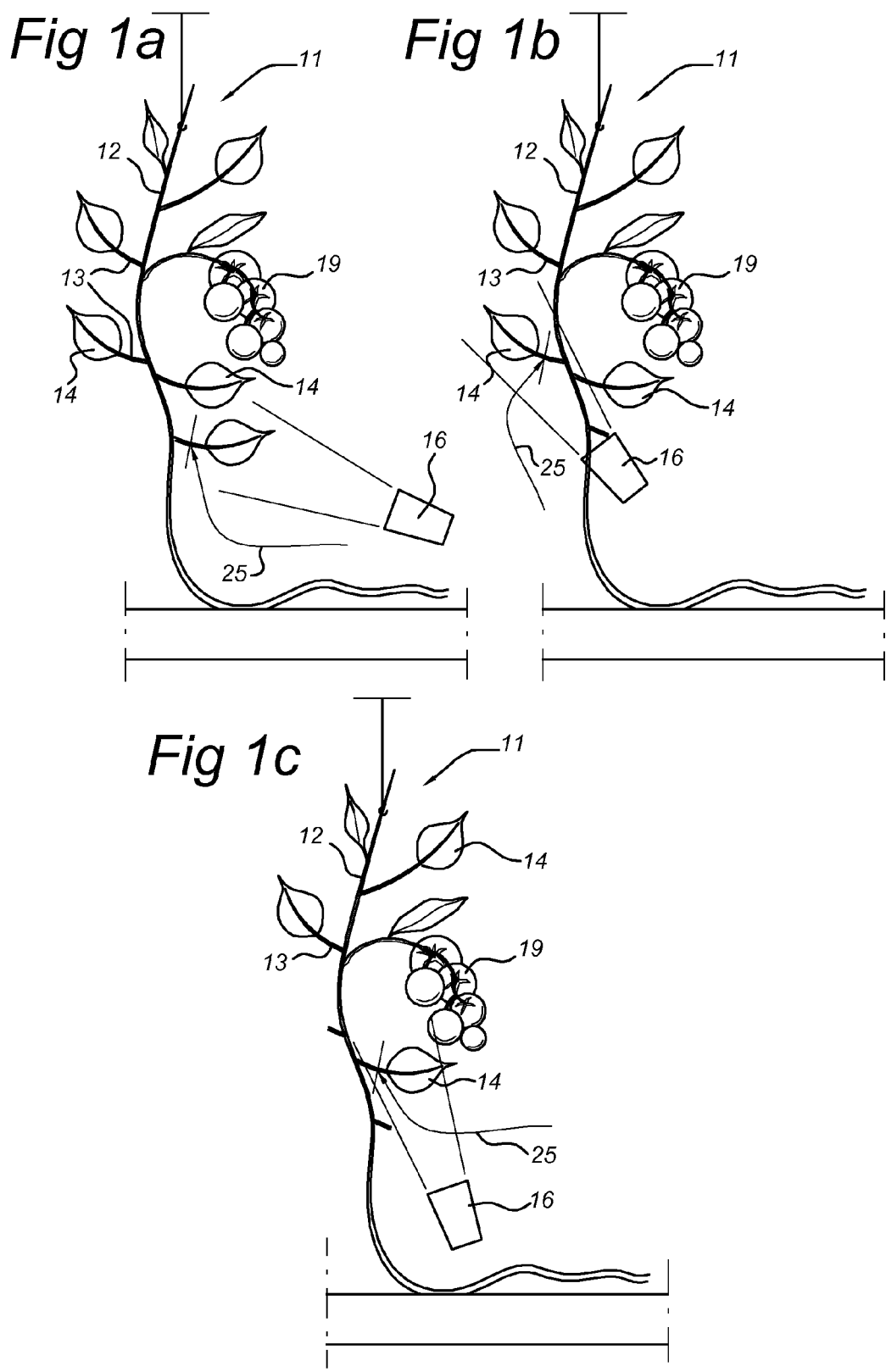

In FIG. 1 a crop 11 is indicated, comprising a central stem 12, a number of leaves 14 joined to the central stem by a stalk 13 and fruits 19. It will be understood that, depending on the crop, the central stem 11 can have any conceivable shape and the same applies to the other parts of the crop. A schematically depicted camera 16 is present, whilst arrow 25 indicates a separation operation.

As is evident from FIG. 1a, the camera 16 is positioned (obliquely) beneath the crop (for example at an angle of 45°). The crop is observed from beneath and, as is evident from FIG. 16, the camera sees the first, lowest leaf 14. The separation means, an example of which will be given hereinafter, are subsequently moved into the field of vision of the camera 16 in order to remove the stalk 13 from the lowest leaf 14 of the crop.

This removal not only comprises the stripping of the stalk from the stem, for example, by cutting or clipping, but also the removal of the leaf and stalk thus obtained away from the crop.

Subsequently, the situation as given in FIG. 1b arises. As the camera 16 operates, the next leaf 14 is then observed unobstructed, as opposed to the situation in 1a. Again, a schematically depicted stripping manipulation of the relevant leaf 25 is performed, as indicated by the arrow 25.

Subsequently, the situation as shown in FIG. 1c arises. Here, camera 16 distinguishes between fruits 19 and the leaf 14 located above and subsequently, according to the arrow 25, this leaf 14 will be removed, but not the fruit 19. The leaves are stripped from the crop in this manner step-by-step until the desired degree of leaf removal is achieved. It will be understood that different cameras 16 can be used.

It will be understood that in the situation in FIG. 1b, wherein the next leaf 14 is observed, this next leaf 14 can also be attached to the central stem of another crop 11. Indeed, because the observation by the camera 16 takes place from beneath, independent of such a central stem, the operation is performed by starting from a low proximity position and by working upwards, so that it is essentially irrelevant which central stem the leaf for removal concerned is attached to.

Figure 2:
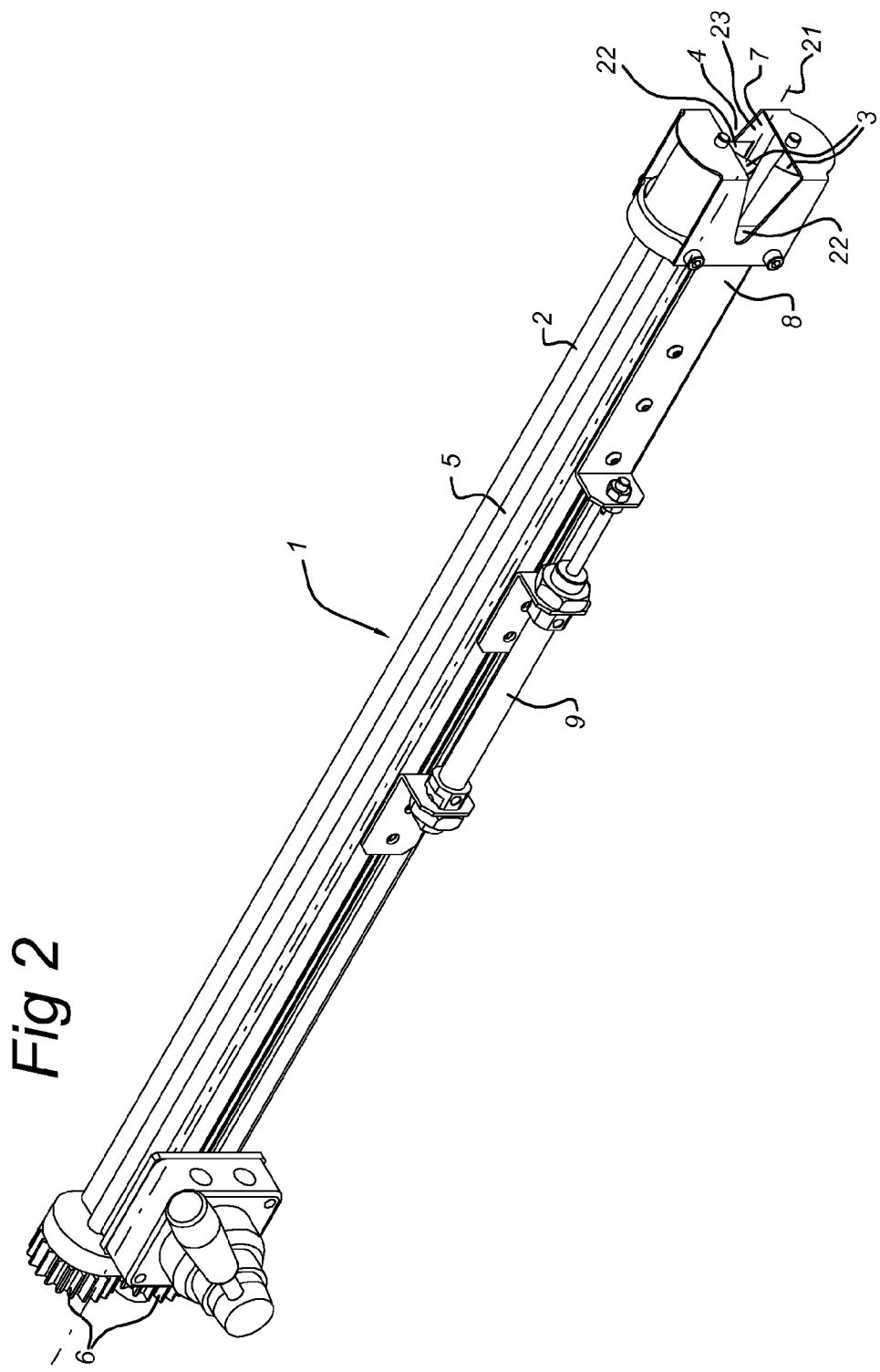
FIG. 2 shows a number of stems from which leaf parts need to be removed with a schematically illustrated assembly according to the invention.

In FIG. 2, a (robot) arm 1 is indicated as an example according to the present invention. This comprises a frame 2 which comprise the various parts to be described hereinafter. Two roller parts 3 arranged opposite each other. The rollers are not complete, but are each provided with a recess 4. In the position as shown in FIG. 1, this creates a considerable clearance between the roller parts 3, as shown in FIG. 1, and this clearance is indicated by numeral 23. This clearance is delimited on both sides by an accommodation 7.

Each of the roller parts is connected to a gearwheel 6 via a shaft 5. The gearwheels 6 engage one another, thus ensuring the synchronised rotation of the roller parts 3. There is a common drive motor, not depicted in detail, which is controlled by a control unit not depicted here and described hereinafter. When the roller parts rotate, the clearance 23 decreases until the outer surfaces of the roller parts come to rest upon each other. The roller parts preferably comprise a deformable material such as a rubber material, thus enabling a part positioned in between, such as a part of a stalk to be described hereinafter, to be engaged in a firm manner.

One or both of the accommodations 7 is constructed in such a manner that a blade 8 with a cutting edge 22 can move reciprocally along it. The drive unit for this blade 8 is driven, for example, by a pneumatic cylinder 9 that is also controlled by the control system 17 which is not shown here. The arm 1 is elongated in shape and has a longitudinal shaft 21. It will be understood that the arm shown here is merely exemplary. This can be constructed telescopically, for example, but can also form part of any other movable construction. For the present stripping device, the end part of the arm and its drive system are of primary importance.

Figure 3:
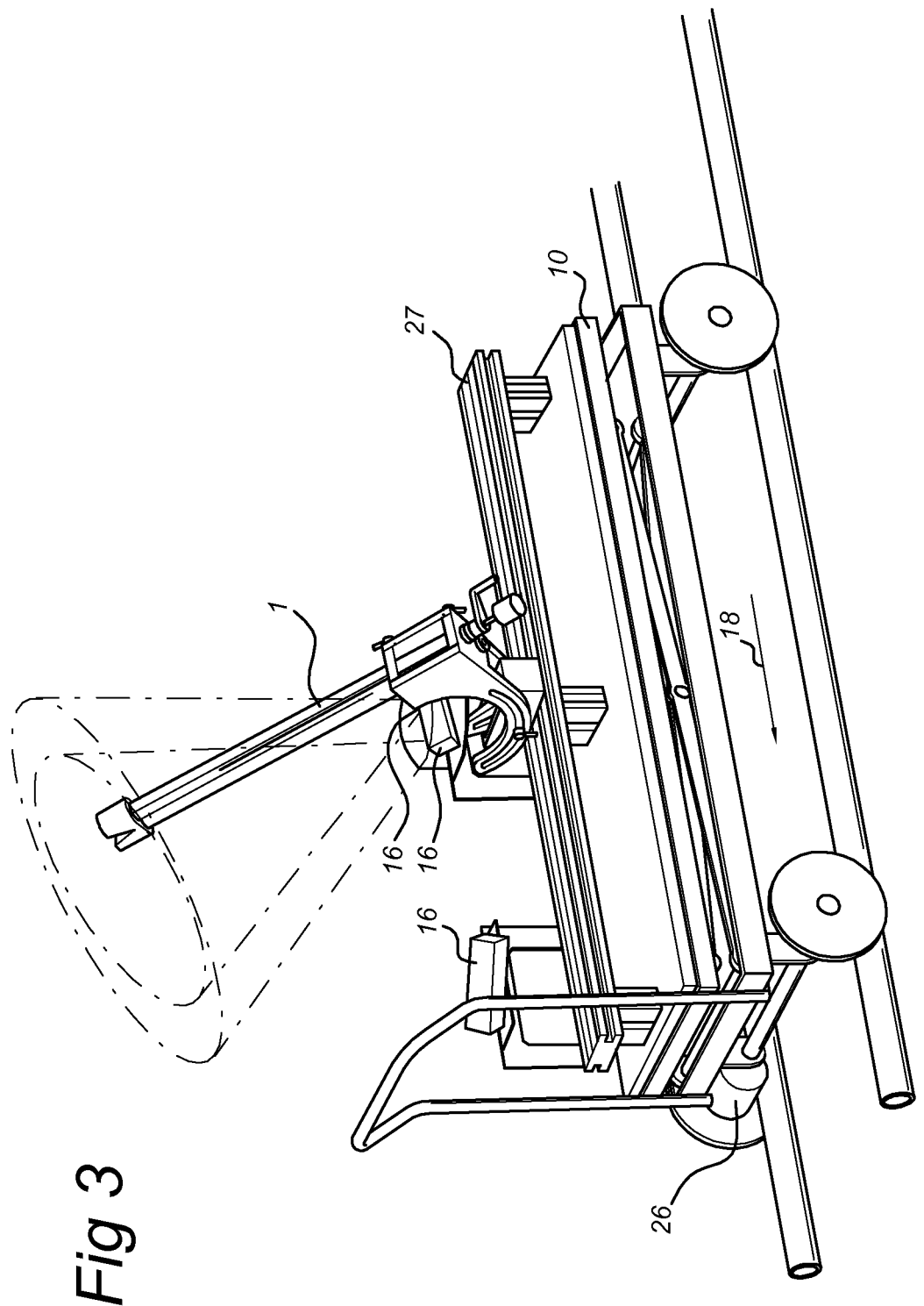
FIG. 3 shows the arm according to the present invention during the uptake of a stalk member.

In FIG. 3, a schematic arrangement of a device according to the invention is shown. This comprises a trolley 10, such as a pipe-rail trolley, with its own drive 26. Three cameras 16 are arranged on the trolley, wherein only two cameras located adjacent to one another are effective. Furthermore, the arm 1, according to the invention, is mounted on this trolley and this is movable in respect of the a sled arrangement 27. It will be evident from FIG. 3 that the operational range of the arm 1 corresponds approximately to the operational range of camera 16, so that any obstacles obstructing the arm 1 will be observed by the camera 16.

According to the invention, the trolley 10 is moved in the direction of the arrow 18 to the lower side of the main stem 12 of one of the crops. The cameras 16 then become active and observe the crop from beneath. This observation is performed in the shape of a cone. With the aid of vision techniques, it is determined where a stalk of a leaf to be removed is located. The arm 7 is subsequently manipulated with the control system 17. It will be understood that a mechanism is present (not shown) in order to move the arm 7 through some distance in the vertical direction. Manipulation at an angle is also possible. Likewise, all other conceivable displacements are possible, such as rotation about the horizontal and vertical axes and translation along the longitudinal axis.

Figure 4:
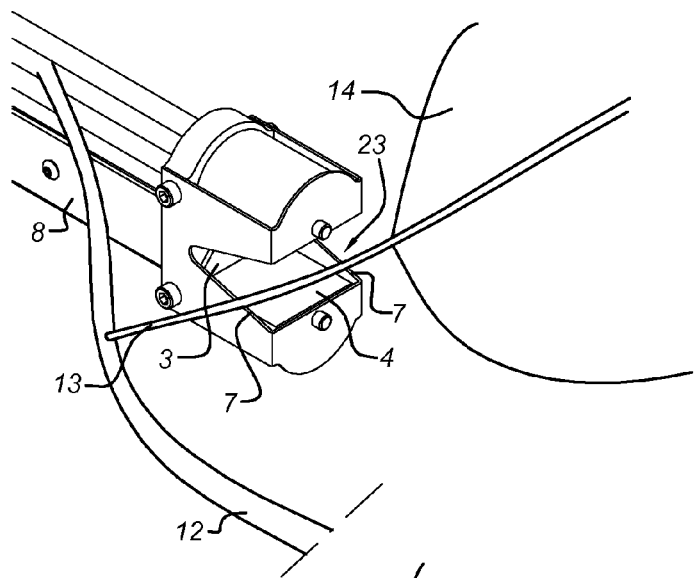
FIG. 4 shows the stripping means according to the present invention during the clamping of a stalk member.
Figure 5:
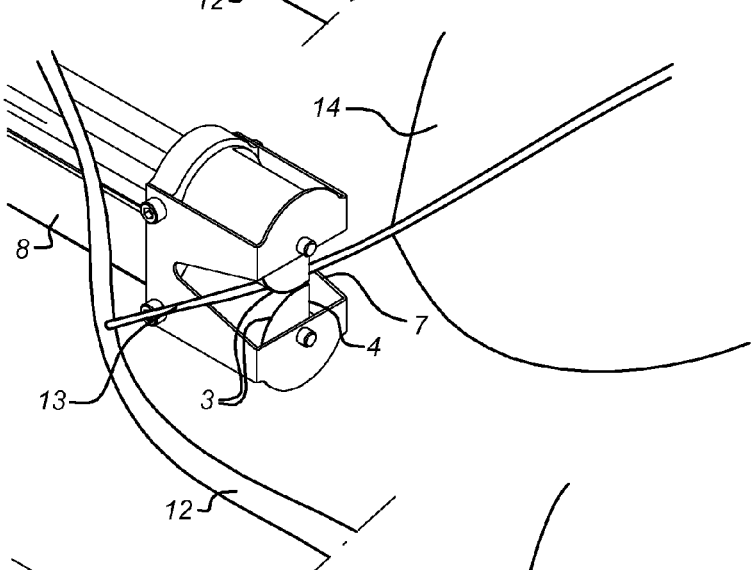
FIG. 5 shows the stripping means according to the present invention during the clamped movement of a stalk member according to the present invention.

FIG. 4 shows the result of the foregoing in more detail. Arm 1 approaches the stalk 13 in the most optimum manner, i.e. in the manner giving the greatest chance of engaging the stalk 13. This will generally be close to the attachment between the leaf 14 and the main stem 12. The roller parts are in the position as shown in FIG. 1, i.e. there is a relatively large clearance 23 between the roller parts. The stalk is taken up in this opening and in the accommodation 7. Although this position is the most optimum for grasping the stalk, this position is not the desired position for stripping the stalk from the main stem. For this to be achieved, it is necessary to choose a location closer to the main stem 12. In order to achieve this, the roller parts are subsequently rotated with the control system 17. This causes the clearance 23 between the roller elements to decrease until the stalk is eventually grasped. This is shown in FIG. 5. When further rotated, the grip on the stalk will pull on the stalk. This occurs until the device comes into contact with the stem.

With this motion, the other parts of the crop will be pushed out of the way without causing damage.

Figure 6:
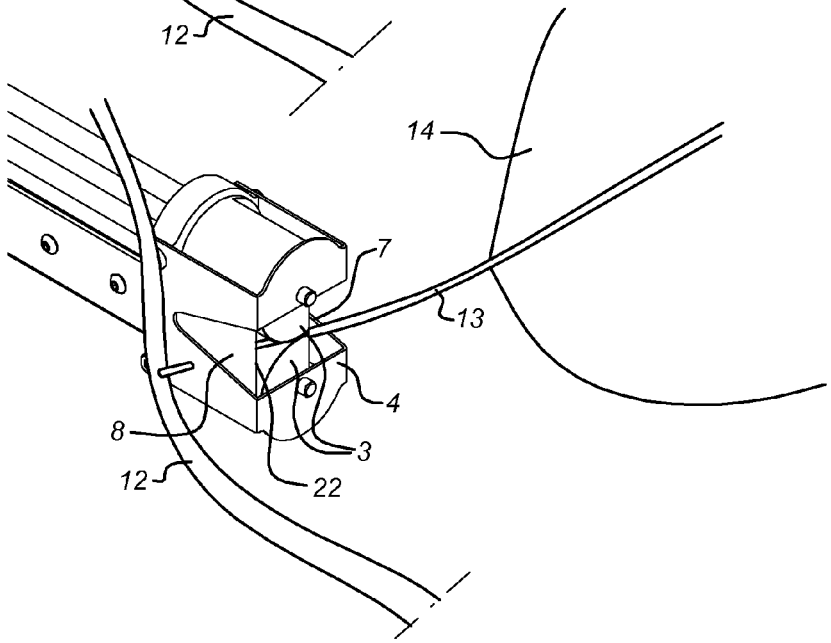
FIG. 6 shows the cutting of the stalk member from the main stem using the device according to the invention.

When the arm has reached the most optimum position on the stalk for the stripping of the stalk from the main stem 12, cutting is performed as shown in FIG. 6. The blade 8 positioned closest to the main stem is used for this purpose. The stalk remains held in the nip between the two rollers 3. The arm is subsequently moved away from the crop and the leaf is released again by rotation of the rollers 3.

After reading the foregoing, those skilled in the art will be readily aware of alternative embodiments. These fall within the scope and spirit of the appended claims and are evident according to the foregoing description. It is possible, for example, for the rollers to have an elliptic shape.

The invention claimed is:

1. A method for removing leaves from a crop plant, comprising:
    (a) providing a device comprising a camera, a means for stripping the leaves mounted to a mobile trolley, and a central processing unit, the device being connected with and controllable by the central processing unit;
    (b) visually observing the leaves of the plant from a position below the leaves with said camera;
    (c) identifying a first leaf to be removed, while differentiating between the leaf and other parts of the plant that will not be removed; and
    (d) removing said first leaf by said means for stripping the leaves, while leaving said other parts of the plant, wherein removing the leaf comprises:
    grasping the leaf or a stalk of the leaf,
    stripping the leaf from the central stem of the plant, and carrying the leaf away from the plant; and
    (e) repeating steps (b)-(d) to determine a subsequent leaf to be removed and removing said subsequent leaf.

2. The method according to claim 1, wherein visually observing the leaves comprises observing the plant from two different positions in one horizontal plane.

3. The method according to claim 1, wherein the leaf is stripped from the central stem by removing the stalk of the leaf at a position in close proximity to the stem.

4. The method according to claim 3, wherein after grasping said leaf or stalk, the means for stripping the leaves moves the central stem in a direction towards the stripping means.

5. The method according to claim 4, wherein the central stem is moved until contact is made with the stripping means.

6. The method according to claim 1, wherein removing the leaf further comprises pushing aside other parts of the plant when stripping said leaf.

7. The method according to claim 1, wherein the means for stripping the leaves grasps the leaf without prior contact with the central stem.

8. The method according to claim 1, wherein stripping the leaf comprises stripping the stalk of the leaf at two separate positions.

9. The method according to claim 1, wherein stripping the leaf comprises cutting or clipping the stalk of the leaf.

10. The method according to claim 1, wherein the means for stripping the leaves is moved according to a line of sight of said camera.

11. The method according to claim 1, wherein the first leaf and the subsequent leaf are growing on different plants.

12. The method according to claim 1, wherein the device further comprises sensors configured to sense the position of the stripping means with respect to the leaf.

13. A device for removing a leaf from a crop plant, comprising:
    two cameras, each camera positioned to observe the plant from beneath the leaf,
    a central processing unit connected with the cameras and comprising vision techniques configured to determine a leaf to be removed and other parts of the plant that will not be removed, and
    two means for stripping the leaves mounted on a mobile trolley,
    wherein the device is controlled by the central processing unit, and is configured to grasp, separate and remove said leaf, while leaving said other parts of the plant, and
    wherein the two cameras are arranged at different positions and the two stripping means act cooperatively therewith.

14. The device according to claim 13, wherein the two cameras and the central processing unit are mounted on the trolley.

15. The method according to claim 1, wherein the crop plant is a fruit plant or a vegetable plant.

* * * * *

UNITED STATES PATENT AND TRADEMARK OFFICE
CERTIFICATE OF CORRECTION

PATENT NO. : 8,666,552 B2  
APPLICATION NO. : 12/937819  
DATED : March 4, 2014  
INVENTOR(S) : Ronald Zeelen Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 625 days.

Signed and Sealed this

Twenty-ninth Day of September, 2015

Michelle K. Lee
*Director of the United States Patent and Trademark Office*